(12) United States Patent
Stelljes

(10) Patent No.: US 9,521,928 B1
(45) Date of Patent: Dec. 20, 2016

(54) BARBECUE COOKING SYSTEM

(71) Applicant: Raymond B. Stelljes, Bullhead City, AZ (US)

(72) Inventor: Raymond B. Stelljes, Bullhead City, AZ (US)

(*) Notice: Subject to any disclaimer, the term of this patent is extended or adjusted under 35 U.S.C. 154(b) by 115 days.

(21) Appl. No.: 14/564,723

(22) Filed: Dec. 9, 2014

Related U.S. Application Data (60) Provisional application No. 61/968,605, filed on Mar. 21, 2014.

(51) Int. Cl.
*A47J 37/07* (2006.01)

(52) U.S. Cl.
CPC .................................. *A47J 37/0763* (2013.01)

(58) Field of Classification Search
CPC .................................................. A47J 37/0763
USPC ....... 126/9 B, 27, 37 R, 38, 37 B, 9 R, 25 R; 99/421 V, 450, 447
See application file for complete search history.

(56) References Cited

U.S. PATENT DOCUMENTS

| | | | |
|---|---|---|---|
| 2,792,773 A * | 5/1957 | Barker ................ | A47J 37/0763 126/25 A |
| 2,821,187 A | 1/1958 | Tescula | |
| 4,120,279 A | 10/1978 | White | |
| D256,084 S | 7/1980 | Lepper | |
| 4,850,333 A | 7/1989 | Dellrud et al. | |
| 5,086,752 A * | 2/1992 | Hait .......................... | F24C 1/16 126/25 R |
| 5,184,599 A * | 2/1993 | Stuart .................. | A47J 37/0704 126/25 R |
| 5,317,961 A | 6/1994 | Shinler | |
| 5,665,258 A | 9/1997 | Hsu | |
| 6,837,149 B1 | 1/2005 | Tsontakis | |
| 8,291,896 B1 | 10/2012 | Gonnella et al. | |
| 2010/0199855 A1 | 8/2010 | Georgis | |
| 2012/0073557 A1 | 3/2012 | Knight | |
| 2012/0241435 A1 | 9/2012 | Best | |
| 2013/0055906 A1* | 3/2013 | Kanbur ............... | A47J 37/0623 99/419 |

OTHER PUBLICATIONS http://www.bakertowne.com/1111/Visvardis-DG12V-Commercial-Turbo-Gyro-Machine-Rotisserie.html (Oct. 1, 2010).

* cited by examiner

*Primary Examiner* — Steven B McAllister
*Assistant Examiner* — Rabeeul Zuberi
(74) *Attorney, Agent, or Firm* — Robert C. Montgomery; Montgomery Patent & Design LP (57) ABSTRACT

A barbeque cooking system is disclosed. The system includes heating modules expandably connected together and movable between a closed state and an open state. The heating modules define an internal cooking volume when in the open state. The system further includes a frame removably connected to the heating modules to retain the heating modules in the open state. Each heating module supports a heat source. The heating modules direct heat from the heat source radially inward to a center of the cooking volume.

17 Claims, 6 Drawing Sheets

BARBECUE COOKING SYSTEM

RELATED APPLICATIONS

The present invention was first described in and claims the benefit of U.S. Provisional Application No. 61/968,605 filed Mar. 21, 2014 the entire disclosures of which are incorporated herein by reference.

FIELD OF THE INVENTION

The present invention relates generally to barbeque cooking systems and, more particularly, to a portable, outdoor radiant heating barbeque cooking system.

BACKGROUND OF THE INVENTION

Spending time in the great outdoors is among the most popular fair weather leisure time activities. Quite often, cooking, and eating a meal is made part of the outdoor activity. Whether it is while camping, at a picnic, or just having a cookout on the backyard patio, a great deal of time is spent cooking food.

Most often, a grill operated by charcoal or gas is used to prepare the food. This method requires that the food be placed directly upon the grilling surface. While such a method undoubtedly produces great tasting food, it is not without its disadvantages.

First, this method utilizes a large heated surface which must be constantly watched to ensure that the flames do not flare up, and that no combustible object comes in contact with the grill. Secondly, this method requires a great deal of food preparation aids including bowls, plates, spatulas, turning forks, and the like.

Accordingly, there exists a need for a means by which food can be cooked in an outdoor environment, without the disadvantages as described above.

SUMMARY OF THE INVENTION

The inventor has recognized the aforementioned inherent problems and lack in the art and observed that there is a need for a radiant heating barbeque system that allows one to easily cook almost any type of food in an outdoor environment on a charcoal-based fire, without the need to constantly attend to the food. The development of the present invention, which will be described in greater detail herein, substantially departs from conventional solutions to fulfill this need.

In one (1) embodiment, the disclosed barbeque cooking system includes heating modules expandably connected together and movable between a closed state and an open state. The heating modules define an internal cooking volume when in the open state. The system further includes a frame removably connected to the heating modules to retain the heating modules in the open state. Each heating module supports a heat source. The heating modules direct heat from the heat source radially inward to a center of the cooking volume.

In another embodiment, the barbeque cooking system includes four heating modules expandably connected together and movable between a closed state and an open state. The heating modules define an internal cooking volume when in the open state. The system further includes a frame removably connected to the heating modules to retain the heating modules in the open state. The heating modules are spaced apart a distance "d" and form a square cross-sectional shape when in the open state. The heating modules are in contact with each other and form a circular cross-sectional shape when in the closed state. Each heating module supports a heat source. The heating modules direct heat from the heat source radially inward to a center of the cooking volume.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 5 is a perspective view of one vertical heating module of the outdoor barbecue system, according to one embodiment of the present invention; and.

DESCRIPTIVE KEY 10 outdoor barbecue system
15 vertical heating modules
20 nonflammable anti-heat transfer surface
25 distance "d"
30 horizontal cross member
35a lower frame section
35b upper frame section
36 frame hinge
38 anchor fixture
38a tube
38b eyelet
45 chain
50 chain hook
55 food item
60 heat
65 cylindrical shape
70 hemispherical shape
75 flat face 80 latch
85 carrying handle
90 midpoint hinge connection
95 travel path "T"
100 hinged connection
105 access path "A"
110 heat shield
115 insulating material
118 reflective material
120 exterior area
125 heat source container
130 fuel
135 ash container
140 sleeve
150 grill platform
152 grill hook

DETAILED DESCRIPTION OF THE
PREFERRED EMBODIMENT

In accordance with the invention, the best mode is presented in terms of a one or more of the disclosed embodiments, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

As used herein, the terms "first", "second", "third", etc. are used as labels to describe various elements, features, and/or components, and are not intended to impose ordinal, positional, or hierarchical requirements on the referenced items, unless other indicated. For example, such terms may be used to distinguish one (1) element from another element.

As used herein, relative terms such as "front", "rear", "left", "right", "top", "bottom", "below", "above", "upper", "lower", "horizontal", or "vertical" are used to describe a relationship of one (1) element, feature and/or region to another element, feature and/or region as illustrated in the figures.

Referring generally to FIGS. 1-6, disclosing example embodiments of the disclosed outdoor barbeque system (herein referred to as the "system") 10, where like reference numerals represent similar or like parts.

Figure 1:
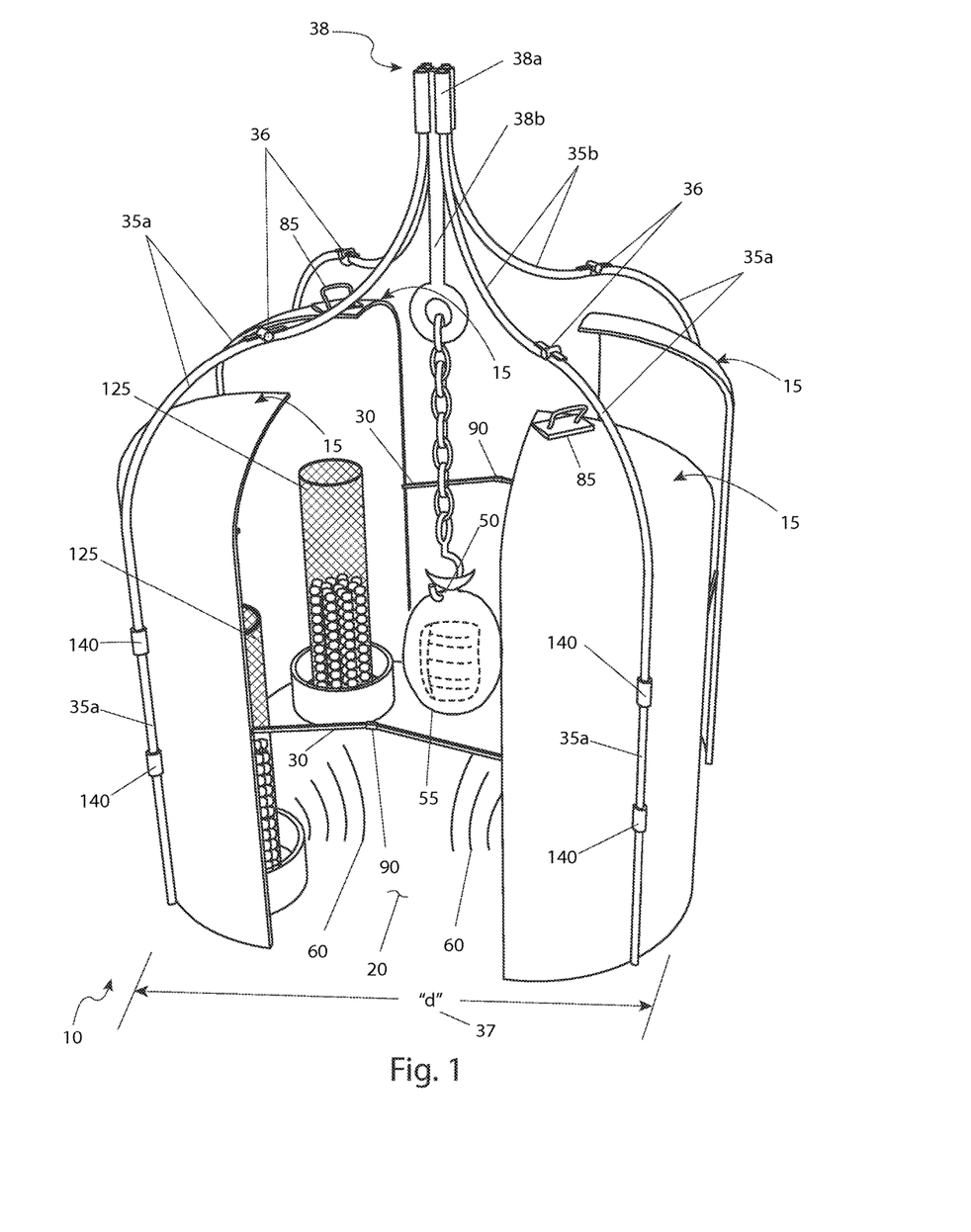
FIG. 1 is a perspective view of an outdoor barbecue system illustrated with vertical heating modules in a utilized state, according to one embodiment of the present invention.

Referring to FIG. 1, one embodiment of the system 10 includes four (4) vertical heating modules 15, for example, arranged in a square pattern at ninety degrees (90°) to each other. FIG. 1 depicts the outdoor barbecue system 10 with the vertical heating modules 15 in an open and utilized state. The vertical heating modules 15 all sit upon a nonflammable, anti-heat transfer surface 20 such as dirt, gravel, or the like.

The vertical heating modules 15 are arranged at a distance "d" 25 when in the open and utilized state, envisioned to be approximately thirty-seven inches (37 in.).

The vertical heating modules 15 are held in position with the use of four (4) horizontal cross members 30. The horizontal cross members 30 provide stability about the lower portion of the vertical heating modules 15 when in the open state.

Figure 5:
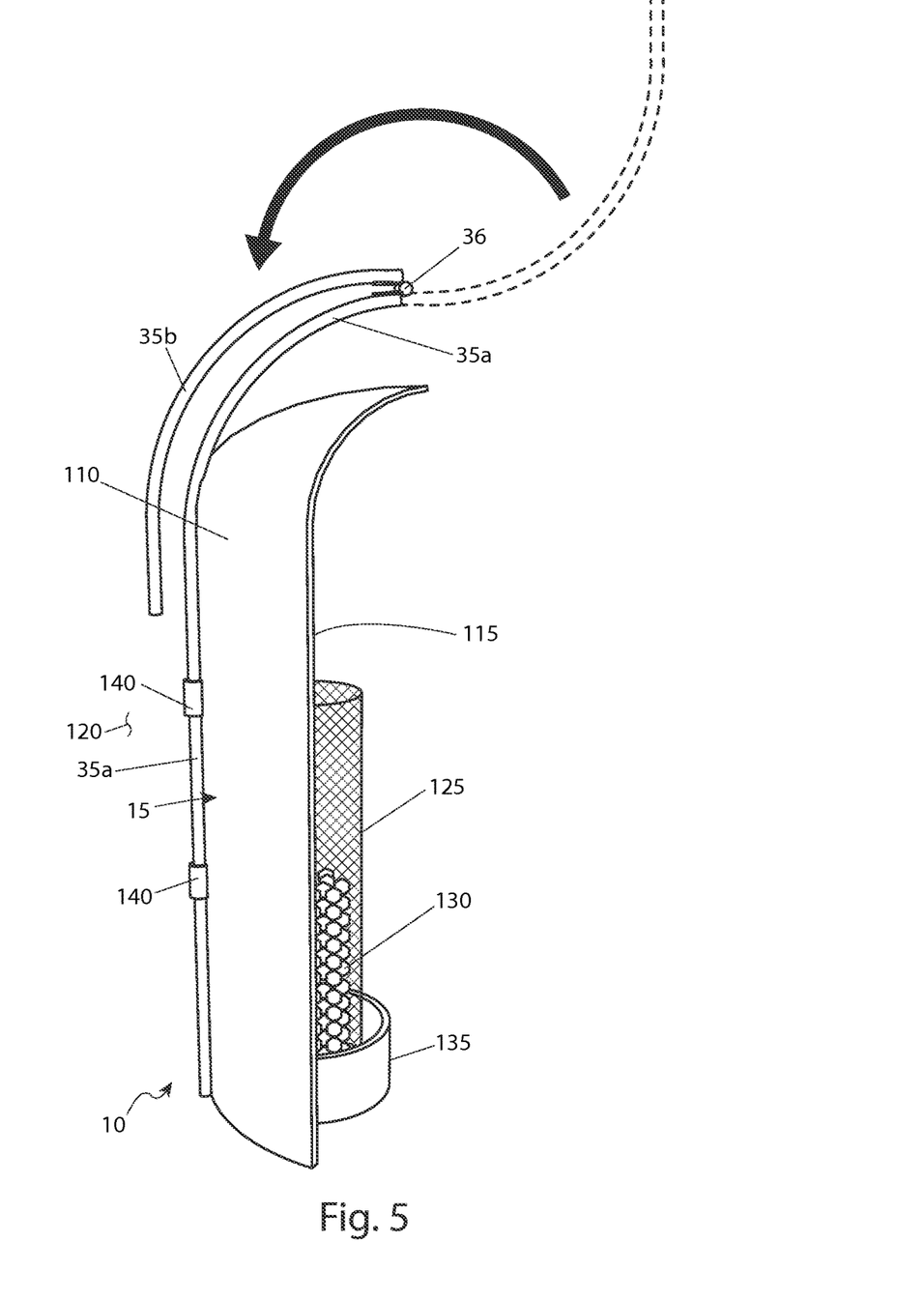

Referring to FIGS. 1 and 5, the stability of an upper portion of each vertical heating module 15 is provided by respective lower frame sections 35a and upper frame sections 35b, for example, made of heavy duty wrought iron due to its heat resistant properties. Each lower frame section 35a provides a vertical portion being connected to an associated vertical heating module 15, for example, via a pair of sleeves 140. A top end portion of each vertical portion of the lower frame section 35a curves in a generally horizontal direction inwardly, for example, approximately ninety (90°) degrees, where it is hingedly connected to a respective upper frame section 35b.

Each upper frame section 35b in turn curves in a generally vertical direction, for example, approximately ninety (90°) degrees, to a generally vertical orientation. The four (4) upper frame sections 35b are inserted into an anchor fixture 38 (FIG. 4b) that joins and stabilizes the frame sections 35a, 35b together.

Figure 4A:
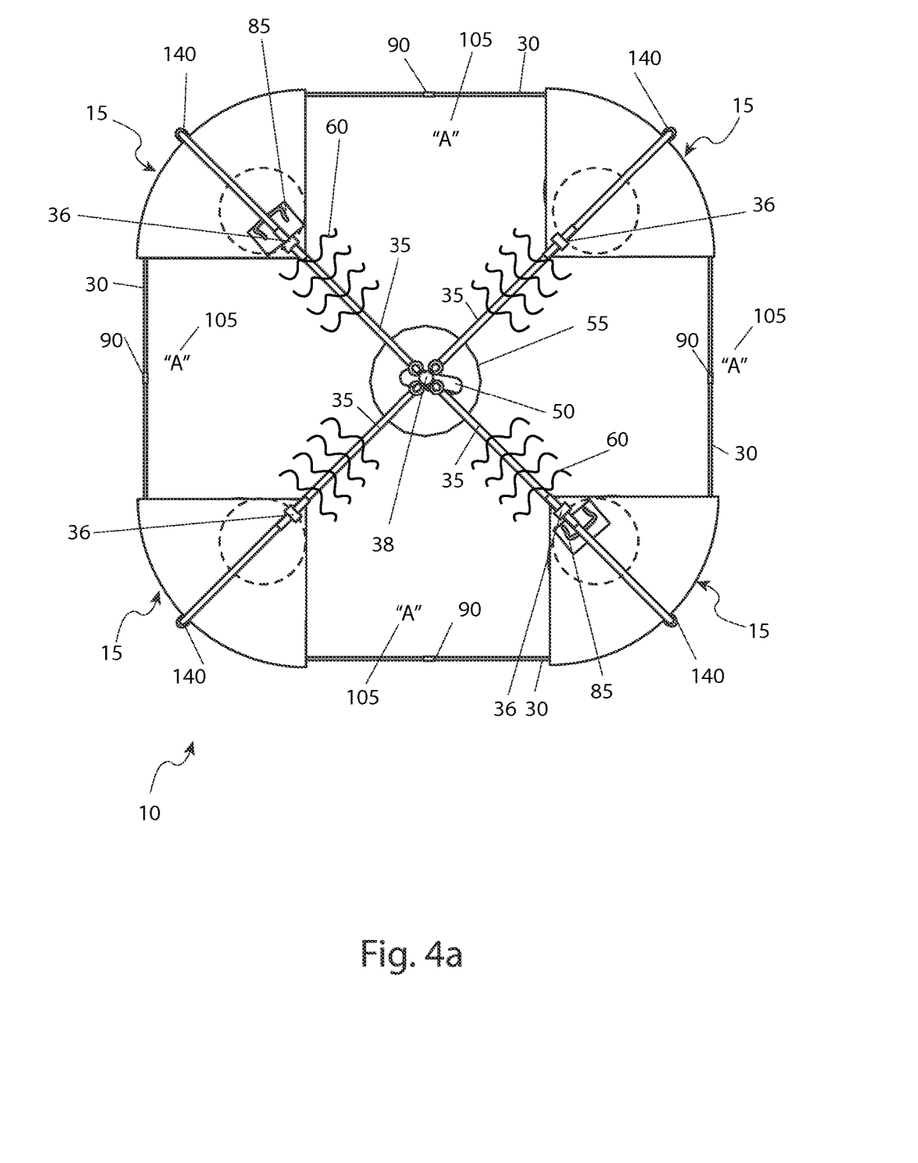
FIG. 4a is a top plan view of the outdoor barbecue system of FIG. 1.
Figure 4B:
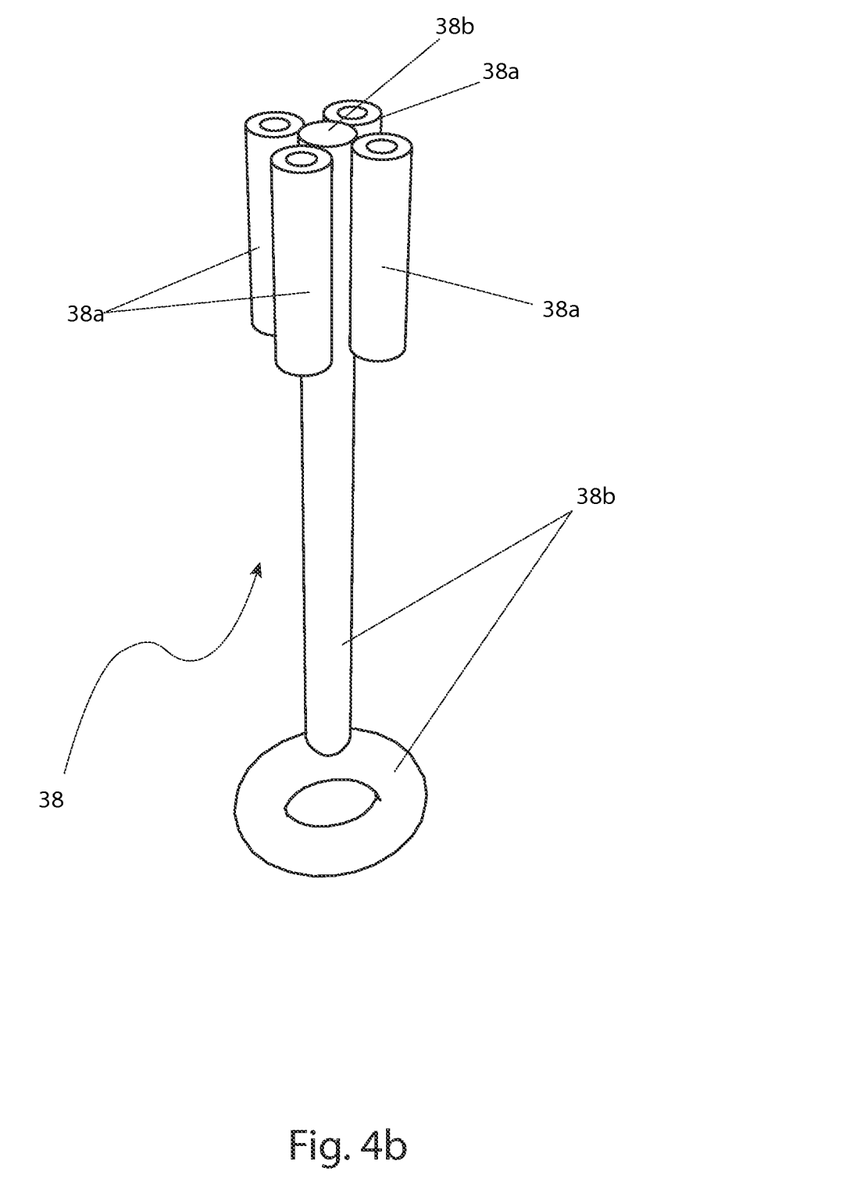
FIG. 4b is a perspective view of an anchor fixture of the outdoor barbecue system, according to one embodiment of the present invention.

Referring to FIGS. 1 and 4b, the anchor fixture 38 provides an eyelet 38b that supports a section of chain 45, which in turn supports a chain hook 50 (FIG. 1). The chain hook 50 can be used to support a food item 55 (FIG. 1).

Figure 3:
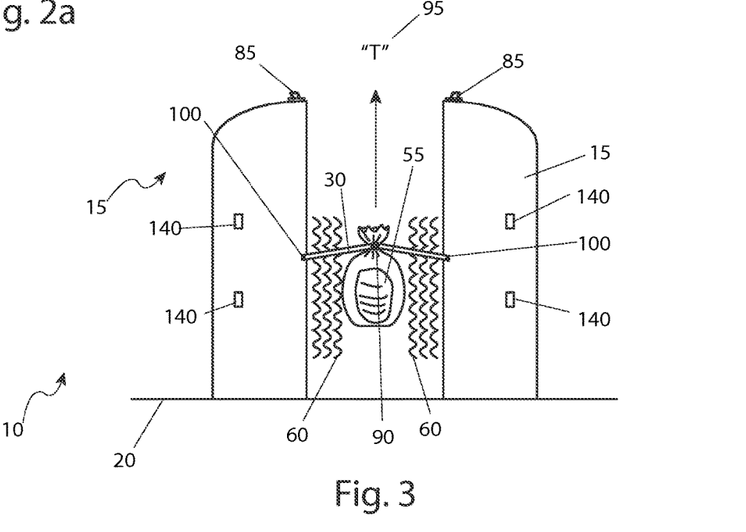
FIG. 3 is a side elevational view of the outdoor barbecue system illustrated with vertical heating modules in the utilized state, according to one embodiment of the present invention.
Figure 6:
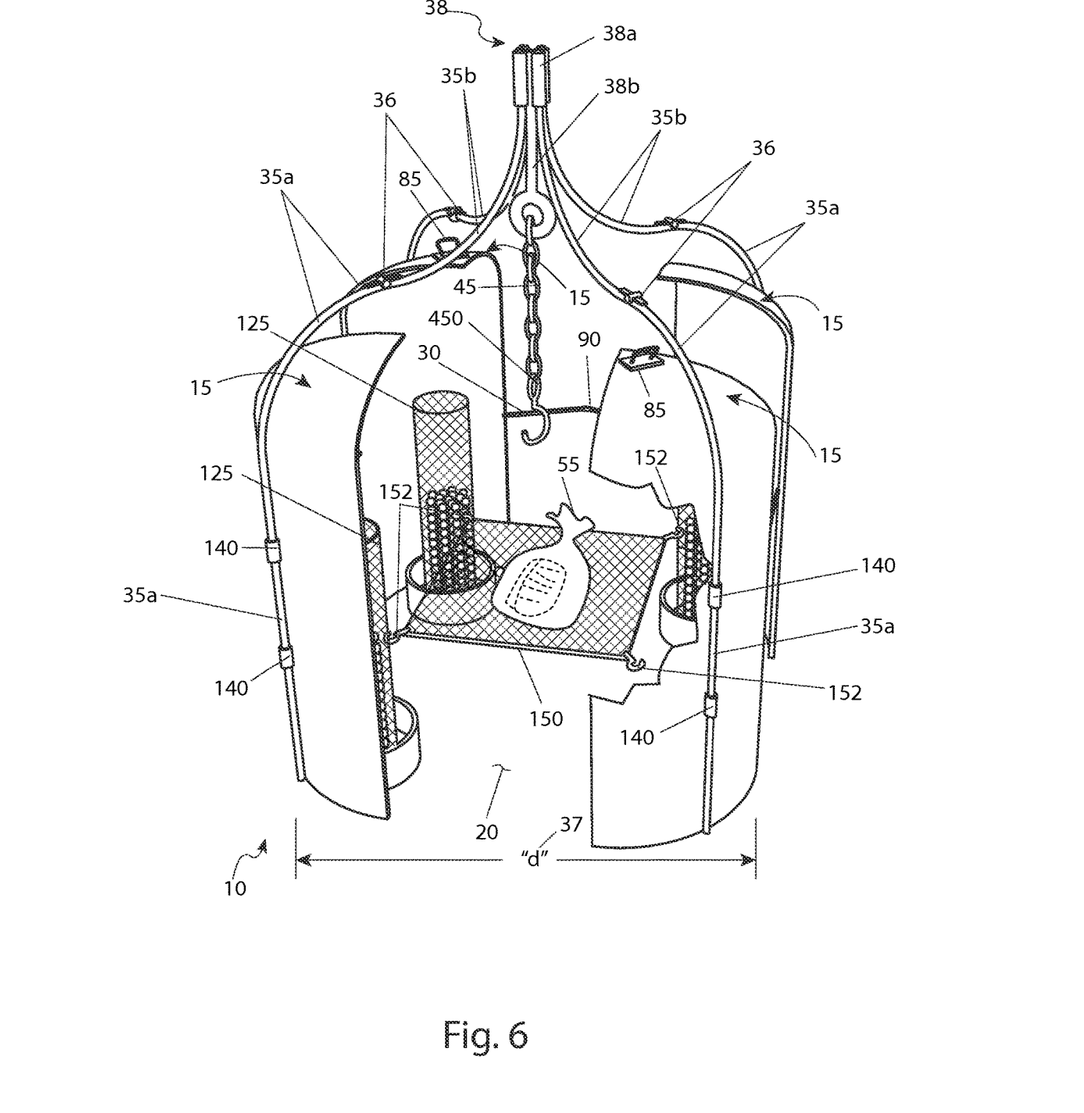
FIG. 6 is a perspective view of the outdoor barbecue system, according to another embodiment of the present invention.

Referring to FIGS. 1, 3 and 6, it is envisioned that the food item 55 could be any one (1) of a multitude of items such as a metal pot or basket containing various foodstuffs, or foodstuffs contained within a cooking bag (as shown in FIGS. 1, 3 and 6 for the purpose of illustration and without limitation). The food item 55 is cooked by heat 60 (FIGS. 1 and 3) that is emanating from each of the vertical heating modules 15.

Figure 2A:
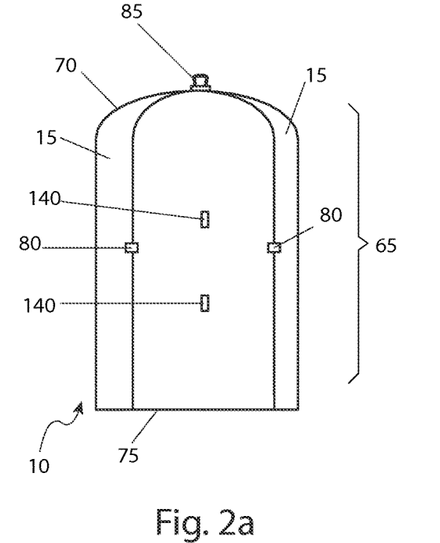
FIG. 2a is a side elevational view of the outdoor barbecue system illustrated with vertical heating modules in a closed and stowed state, according to one embodiment of the present invention.
Figure 2B:
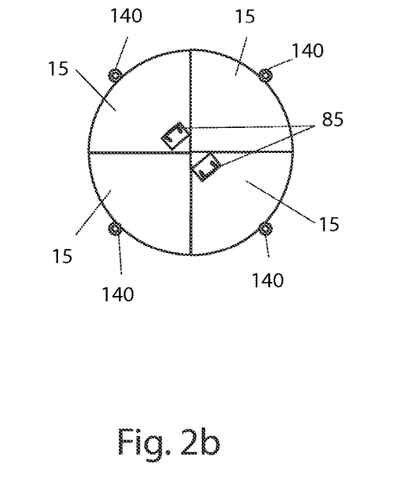
FIG. 2b is a top plan view of the outdoor barbecue system of FIG. 2.

Referring to FIGS. 2a and 2b, the system 10 is depicted with the vertical heating modules 15 in a closed and stowed state. The closed and stowed state is possible by removing the lower and upper frame 35a, 35b (FIG. 1) and folding the horizontal cross member 30 (FIG. 1) upward to allow the four (4) vertical heating modules 15 to move inward resulting in a generally cylindrical shape 65 with the upper end in a hemispherical shape 70 and the lower end in a flat face 75.

Once the vertical heating modules 15 are placed in close proximity to one (1) another (e.g., in the closed and stowed state), a plurality of latches 80 are activated to hold the vertical heating modules 15 together (only two (2) latches 80 are visible in FIG. 2 due to illustrative limitations).

Two (2) carrying handles 85 are provided to aid in carrying the system 10. Such carrying is envisioned to occur when the system 10 is placed in the closed and stowed state (e.g., when moving into or removing from a storage location or during periods of non-use).

FIGS. 3 and 4, depicts the system 10 sitting upon the nonflammable, anti-heat transfer surface 20. The upper and lower frames 35a, 35b (FIG. 1) are omitted from FIG. 3 for purposes of clarity. The heat 60 emanates inwardly from the vertical heating modules 15 to the food item 55. Such a heat pattern provides for three hundred sixty degrees (360°) of heat coverage versus the one hundred eighty degrees (180°) of coverage that is normally present when cooking on a barbecue grill.

The horizontal cross members 30 collapse about a midpoint hinge connection 90 and fold upward along a travel path "T" 95 due to hinged connections 100 to place the system 10 in the closed and stowed state. The horizontal cross members 30 extend about the midpoint hinge connection 90 and fold downward (e.g., in a direction opposite travel path "T" 95) due to hinged connections 100 to place the system 10 in the open and utilized state. It should be noted that this configuring operation is repeated four times on each side of the system 10, although only one (1) side is shown in FIG. 3.

The food item 55 is centrally located thus allowing access to it from any of the four (4) sides of the system 10. Those skilled in the art will appreciate that the cooking manner enabled by the system 10 requires little or no tending. However, minor access as well as placement and removal duties are still required.

Due to the heat 60 being present in all-encompassing, access to the food item being cooked 55 requires use of long handled tools that can reach inward as depicted by an access path "A" 105 (FIG. 4). As with any cooking appliance, extreme care must be used with the system 10 not only for the user to avoid accidental contact, but also to ensure that other individuals, animals, objects and the like do not contact the system 10.

Referring to FIGS. 1 and 4b, the four (4) upper frame sections 35b (FIG. 1) are inserted at a top end portion into the anchor fixture 38, which joins and stabilizes the upper and lower frame sections 35a, 35b together. The anchor fixture 38 provides a weldment made up of metal pieces including four (4) tubes 38a and a central solid shaft of an eyelet 38b. The tubes 38a are each hollow and have inner diameters that slidingly receive upper end portions of a respective upper frame section 35b therewithin. The central eyelet 38b protrudes in a downward direction where it supports a length of chain 45, which in turn supports the food item 55 (FIG. 1).

Referring to FIGS. 1 and 5, respective pairings of lower 35a and upper 35b frame sections are hingedly connected to each other via a frame hinge 36. FIG. 5 depicts the construction of each of the nearly identical vertical heating modules 15. The vertical heating modules 15 utilize a heat shield 110 located on the exterior of the system 10.

The heat shield 110 includes three (3) separate layers. The outermost layer is of a durable metal material such as steel, tin or aluminum. The middle or inner layer is of an insulating material 115 such as mineral wool or aerogel. The innermost layer is of a reflective material 118 such as polished stainless steel. As such, heat 60 is reflected inward (FIGS. 1, 3 and 6) while the exterior area 120 remains relatively cool.

A cylindrical heat source container 125 is located on the interior side of the heat shield 110. The heat source container 125 is made of heat resistant steel in a mesh style arrangement. During use of the system 10, it is intended that the heat source container 125 be filled with a solid fuel 130 such as charcoal briquettes, although other material such as burning coals, wood, or the like could be used with equal effectiveness, and as such, should not be interpreted as a limiting factor of the present invention.

The heat source container 125 would be filled to approximately three-quarters (¾) of its capacity as dictated by the food item 55 (FIG. 1). As the fuel 130 is consumed by combustion, additional fuel 130 can be added into the top of the heat source container 125 for an almost unlimited cooking cycle time.

An ash container 135 is located at the bottom of the heat source container 125 to catch any resultant ash that is generated by the combustion of the fuel 130. The ash container 135 would be emptied after each use when cool, into a safe location. The ash container 135 of each heat source container 135 also forms the lower surface of the system 10, which is in direct contact with the nonflammable; anti-heat transfer surface 20 (FIG. 1).

The vertical portions of the lower frame sections 35a are slidingly attached to an outer surface of the each heat shield 110, being inserted through a pair of vertically aligned tubular sleeves 140 being affixed to the heat shields 110, for example, by welding or equivalent attachment method. The upper end portion of each lower frame section 35a is hingedly connected to a respective upper frame section 35b via a single-axis frame hinge 36, which provide a mechanical limitation in one (1) direction so as to lock the frame sections 35a, 35b in a mutually tangential position, as well as allow the lower 35a and upper 35b frame sections to pivot in another direction to fold back upon each other in a compact manner for storage (FIG. 5).

Referring now to FIG. 6, another embodiment of the system 10 is depicted supporting the food item 55 using a suspended grill platform 150 in addition to or in lieu of the chain 45 and chain hook 50.

The grill platform 150 includes a rectangular section of expanded metal mesh having a grill hook 152 affixed to each corner area. The grill hooks 152 are hooked to corresponding and adjacent heat source containers 125. The grill platform 150 may be positioned vertically in a selective manner by attaching the grill hooks 152 to the heat source containers 125 at a desired height. The grill platform 150 may be used to support the food item 55 within the cooking bag (FIG. 6), or a multitude of items such as a metal pot or a basket containing various foodstuffs, or the like.

Those skilled in the art will recognize that other styles and configurations of the disclosed system 10 can be easily incorporated into the teachings of the present disclosure, and only particular example embodiments and configurations have been shown and described for purposes of clarity and disclosure and not by way of limitation of scope.

The example embodiments of the present invention can be utilized by the user in a simple and effortless manner with little or no training. It is envisioned that the system 10 would be constructed in general accordance with FIGS. 1-6. The system 10 would be assembled using the various components, procedures, and processes as aforementioned described. It would be packaged with suitable usage and safety instructions prior to being sold to a retail customer.

During the initial setup, the user would transport the system 10 in its collapsed state (FIGS. 2 and 5) to a suitable exterior usage location. This location would provide the nonflammable, anti-heat transfer surface 20 such as dirt, pavement, gravel, rock or the like. It should be noted that the usage of the system 10 will likely generate grease droppings that may temporarily or permanently stain the nonflammable, anti-heat transfer surface 20 depending on its nature.

Next, the user would open the latches 80 and slide the vertical heating modules 15 apart until the horizontal cross member 30 for each section locks into place at the midpoint hinge connection 90 as provided by the hinged connections 100 (FIGS. 1, 3, 4a and 6). Then, the user would insert the lower frame sections 35a downwardly through the sleeves 140 of each vertical heating module 15. Next, the user would pivot the upper frame sections 35b upward where they would be inserted into respective tube portions 38a of the anchor fixture 38 (FIGS. 1 and 5). At this point in time, the system 10 is deployed and ready to be used.

Prior to actual cooking of the food item 55, the user would place a suitable quantity of fuel 130 into each of the four (4) heat source container 125. It would be ignited in a customary manner with a suitable accelerant if necessary and a fire source such as a match or lighter. After it has burned a suitable period such that heat 60 is generated, the food item 55 would be placed in the center location using the chain 45 and chain hook 50 of the anchor fixture 38 as necessary. The food item 55 would then be left in place with only a minor amount of monitoring and tending. Such an arrangement provides for a radiant style heating arrangement that evenly heats the food item 55 on all sides, without the necessity of constantly watching or turning the food item 55, as is the case with conventional barbecues. Should additional cooking time be required, additional fuel 130 are added to the top of the heat source container 125 as needed.

The system 10 may also utilize the grill platform 150 to support a food item 155 by following the steps of: 1). positioning the grill platform 150 between the heat source containers 125; 2). hooking the grill hooks 152 of the grill platform 150 to the adjacent heat source containers 125 at a desired height; and 3). utilizing the grill platform 150 to support a food item 55, a cooking bag, a metal pot, a basket of foodstuffs, or the like.

After the food item 55 is complete, the user removes it from the system 10 and continues with consumption in the normal manner. The system 10 is allowed to cool to ambient temperature during this time. The ash containers 135 are emptied into a safe location. The anchor fixture 38 is then removed. Next, the upper frame sections 35*b* are folded downward upon the lower frame sections 35*a* and the frame sections 35*a*, 35*b* removed. The midpoint hinge connections 90 of the horizontal cross members 30 are then motioned upwardly along a travel path "T" 95, and the four (4) vertical heating modules 15 are placed in close contact with one another. Finally, the latches 80 are secured and the system 10 transported to a safe storage location via the carrying handles 85. This completes the usage cycle of the system 10, which may be repeated as needed.

Referring generally to FIGS. 1-6, in one example embodiment, the barbeque cooking system 10 includes heating modules 15 expandably connected together and movable between a closed (e.g., stowed) state and an open (e.g., utilized) state. The heating modules 15 define an internal cooking volume when in the open state. The system 10 further includes a frame 35 (identified as lower frame 35*a* and upper frame 35*b*) removably connected to the heating modules 15 to retain the heating modules 15 in the open state. Each heating module supports a heat source. The heating modules 15 direct heat from the heat source radially inward to a center of the cooking volume.

In another example embodiment of the system 10, the heating modules 15 are spaced apart a distance "d" when in the open state. The heating modules 15 are in contact with each other when in the closed state.

In another embodiment, the system 10 further includes cross members 30 interconnecting directly adjacent heating modules 15. Each cross member spans the distance "d" when the heating modules 15 are in the open state.

In another embodiment of the system 10, each heating module includes a heat shield 110, and a heat source container 125 disposed on an interior of the heat shield 110. The heat source container 125 being configured to receive a combustible fuel 130 used as the heat source.

In another embodiment of the system 10, each heating module further includes an ash container 135 disposed on an interior surface of the heat shield 110 below the heat source container 125.

In another embodiment of the system 10, the ash container 135 is positioned at a lower end of the heat shield 110 to support the heating module 15.

In another embodiment of the system 10, the heat shield includes an outermost layer including a metallic material, a middle layer including a thermally insulating material, and an innermost layer including a thermally reflective material.

In another embodiment of the system 10, the frame 35 includes lower frame sections 35*a* removably connected to an exterior of the heating modules 15, and upper frame sections 35*b* pivotally connected to the lower frame sections 35*a*.

In another embodiment, the system 10 further includes an anchor fixture 38 removably connected to the upper frame sections 35*b*.

In another embodiment of the system 10, the anchor fixture 38 includes tubes 38*a* configured to receive to the upper frame sections 35*b*, a shaft extending downwardly from the tubes 38*a*, and an eyelet 38*b* disposed at an end of the shaft.

In another embodiment, the system 10 further includes a chain 45 with a hook 50 connected to the eyelet 38*b* and extending downwardly into the cooking volume.

In another embodiment, the system 10 further includes latches 80 to secure the heating modules 15 in the closed state.

In another embodiment, the system 10 further includes handles 85.

In another embodiment, the system 10 further includes a grill platform 150 connected between the heating modules 15.

In another embodiment, the system 10 includes four heating modules 15 expandably connected together and movable between a closed state and an open state. The heating modules 15 define an internal cooking volume when in the open state. The system further includes a frame 35 (identified as lower frame 35*a* and upper frame 35*b*) removably connected to the heating modules 15 to retain the heating modules 15 in the open state. The heating modules 15 are spaced apart a distance "d" and form a square cross-sectional shape when in the open state. The heating modules 15 are in contact with each other and form a circular cross-sectional shape when in the closed state. Each heating module supports a heat source. The heating modules 15 direct heat from the heat source radially inward to a center of the cooking volume.

In another embodiment, the system 10 further includes four (4) cross members 30 interconnecting the heating modules 15. One (1) cross member 30 interconnecting a directly adjacent pair of heating modules 15. Each cross member spans the distance "d" when the heating modules 15 are in the open state.

In another embodiment of the system 10, each heating module includes a curved heat shield 110, a heat source container 125 connected to an interior of the heat shield 110, and an ash container 135 connected to the interior surface of the heat shield 110 below the heat source container 125. The heat source container 125 being configured to receive a combustible fuel 130 used as the heat source.

In another embodiment of the system 10, the frame 35 includes four (4) lower frame sections 35*a* connected to the four heating modules 15. One (1) lower frame section 35*a* removably connected to an exterior of an associated heating module 15. The frame 35 further includes four (4) upper frame sections 35*b* connected to the four (4) lower frame sections 35*a*. One (1) upper frame section 35*b* pivotally connected to an associated lower frame section 35*a*.

In another embodiment, the system 10 further includes an anchor fixture 38 including four (4) tubes 38*a* configured to receive to the four (4) upper frame sections 35*b*, a shaft extending downwardly from the tubes 38*a*, and an eyelet 38*b* disposed at an end of the shaft. The system 10 further includes a chain 45 with a hook 50 connected to the eyelet and extending downwardly into the cooking volume.

In another embodiment, the system 10 further includes a grill platform 150 connected between the heating modules 15 within said cooking volume.

The foregoing descriptions of example embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A barbeque cooking system comprising:
    heating modules expandably connected together and radially translatable between a closed state and an open state, said heating modules define an internal cooking volume when in said open state; and,
    a frame removably connected to said heating modules to retain said heating modules in said open state, comprising:
        lower frame sections removably connected to an exterior of said heating modules; and,
        upper frame sections pivotally connected to said lower frame sections;
    wherein each heating module supports a heat source;
    wherein said heating modules are spaced apart a pre-determined non-zero distance "d" when in said open state, and wherein said heating modules are in contact with each other when in said closed state; and,
    wherein said heating modules direct heat from said heat source radially inward to said cooking volume.

2. The system of claim 1, further comprising cross members interconnecting directly adjacent heating modules, wherein each cross member spans said pre-determined non-zero distance "d" when said heating modules are in said open state.

3. The system of claim 1, wherein each heating module comprises:
    a heat shield; and,
    a heat source container disposed on an interior of said heat shield, said heat source container being configured to receive a combustible fuel used as said heat source.

4. The system of claim 3, wherein each heating module further comprises an ash container disposed on an interior surface of said heat shield below said heat source container.

5. The system of claim 4, wherein said ash container is positioned at a lower end of said heat shield to support said heating module.

6. The system of claim 3, wherein said heat shield comprises:
    an outermost layer comprising a metallic material;
    a middle layer comprising a thermally insulating material; and,
    an innermost layer comprising a thermally reflective material.

7. The system of claim 1, further comprising an anchor fixture removably connected to said upper frame sections.

8. The system of claim 7, wherein said anchor fixture comprises:
    tubes configured to receive to said upper frame sections;
    a shaft extending downwardly from said tubes; and,
    an eyelet disposed at an end of said shaft.

9. The system of claim 8, further comprising a chain hook connected to said eyelet and extending downwardly into said cooking volume.

10. The system of claim 1, further comprising latches to secure said heating modules in said closed state.

11. The system of claim 1, further comprising handles.

12. The system of claim 1, further comprising a grill platform connected between said heating modules.

13. A barbeque cooking system comprising:
    four heating modules expandably connected together and radially translatable between a closed state and an open state, said heating modules define an internal cooking volume when in said open state; and,
    a frame removably connected to said heating modules to retain said heating modules in said open state, comprising:
        four lower frame sections connected to said four heating modules, one lower frame section removably connected to an exterior of an associated heating module; and,
        four upper frame sections connected to said four lower frame sections, one upper frame section pivotally connected to an associated lower frame section;
    wherein said heating modules are spaced apart a pre-determined non-zero distance "d" and form a square cross-sectional shape when in said open state;
    wherein said heating modules are in contact with each other and form a circular cross-sectional shape when in said closed state;
    wherein each heating module supports a heat source; and,
    wherein said heating modules direct heat from said heat source radially inward to said cooking volume.

14. The system of claim 13, further comprising four cross members interconnecting said heating modules, one cross member interconnecting a directly adjacent pair of heating modules;
    wherein each cross member spans said pre-determined non-zero distance "d" when said heating modules are in said open state.

15. The system of claim 13, wherein each heating module comprises:
    a curved heat shield;
    a heat source container connected to an interior of said heat shield, said heat source container being configured to receive a combustible fuel used as said heat source; and,
    an ash container connected to said interior surface of said heat shield below said heat source container.

16. The system of claim 13, further comprising:
    an anchor fixture comprising:
        four tubes configured to receive to said four upper frame sections;
        a shaft extending downwardly from said tubes; and,
        an eyelet disposed at an end of said shaft; and,
    a chain hook connected to said eyelet and extending downwardly into said cooking volume.

17. The system of claim 13, further comprising a grill platform connected between said heating modules within said cooking volume.

* * * * *